(No Model.)　　　　　　　　　　　　　　　　　　4 Sheets—Sheet 1.
J. G. STOWE.
CORN HARVESTING AND HUSKING MACHINE.

No. 331,459.　　　　　　　　　　　　Patented Dec. 1, 1885.

Witnesses:
Edward C. Day
Milton Dashiell

Inventor:
James G. Stowe,
per E. P. Robbins, M.E.
Atty.

(No Model.) 4 Sheets—Sheet 2.

J. G. STOWE.
CORN HARVESTING AND HUSKING MACHINE.

No. 331,459. Patented Dec. 1, 1885.

Witnesses:
Edward C. Day.
Milton Dashiell

Inventor:
James G. Stowe,
per E. P. Robbins, M.E.,
Att'y.

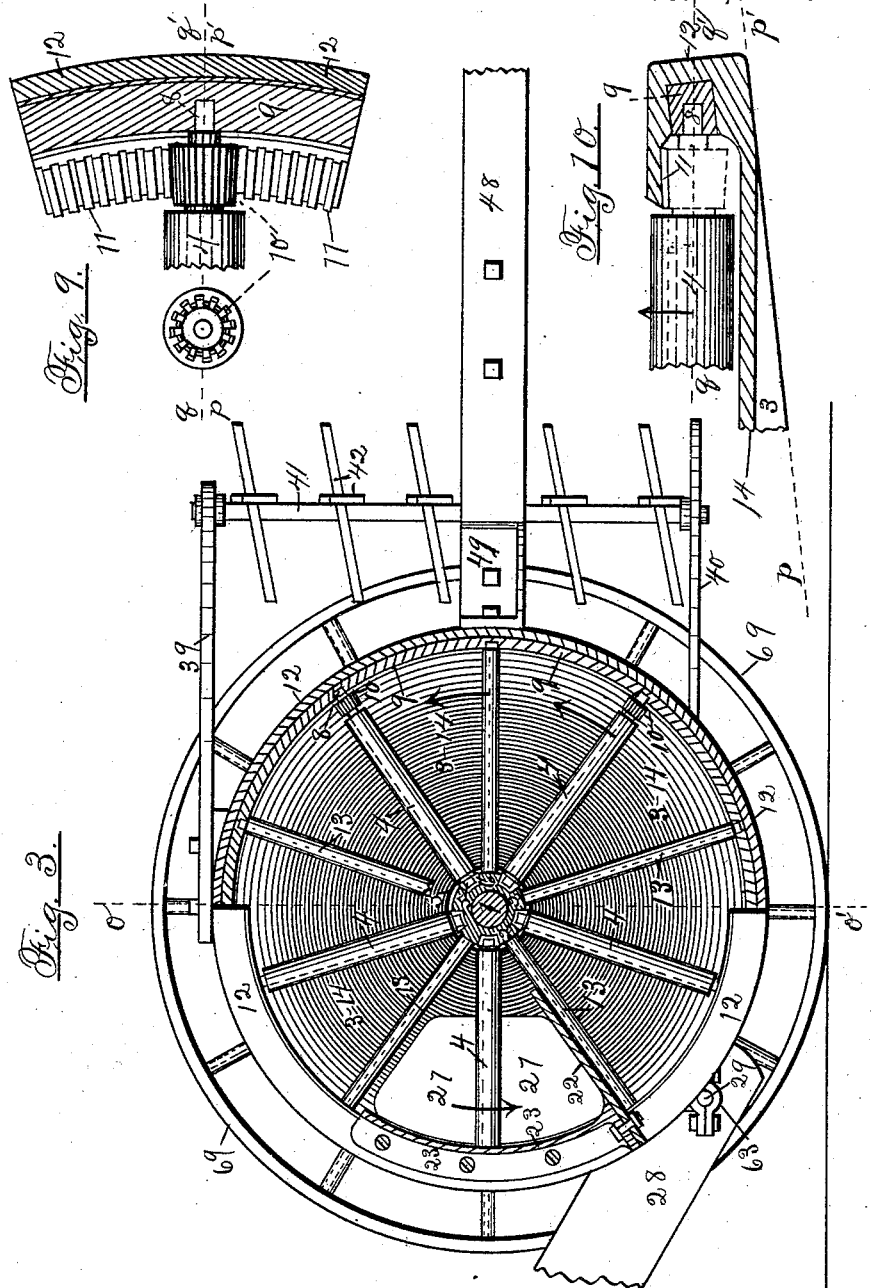

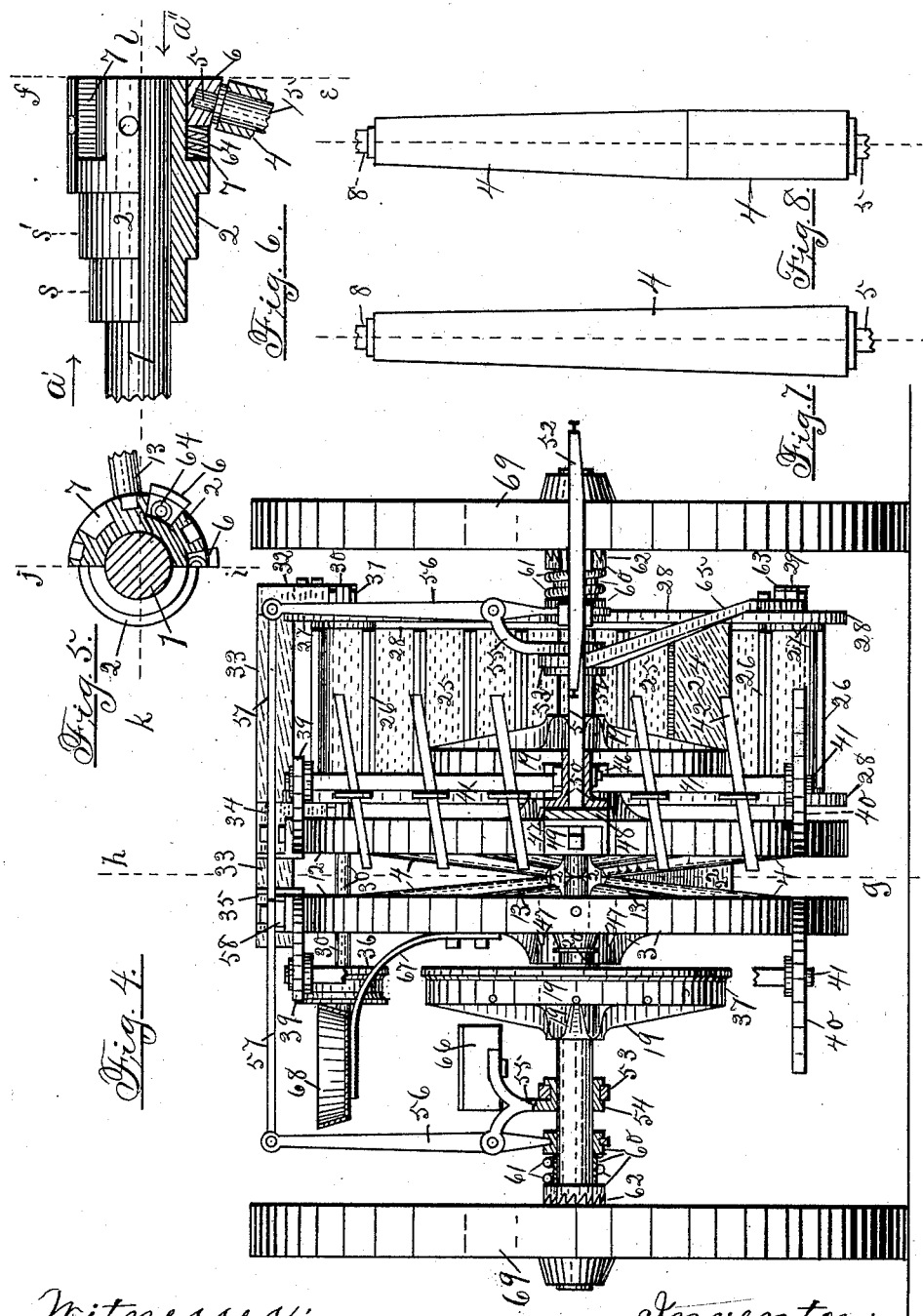

UNITED STATES PATENT OFFICE.

JAMES G. STOWE, OF CINCINNATI, OHIO, ASSIGNOR OF ONE-HALF TO JOHN W. PARKER, OF SAME PLACE.

CORN HARVESTING AND HUSKING MACHINE.

SPECIFICATION forming part of Letters Patent No. 331,459, dated December 1, 1885.

Application filed February 9, 1885. Serial No. 155,375. (No model.)

*To all whom it may concern:*

Be it known that I, JAMES G. STOWE, a citizen of the United States, residing at Cincinnati, in the county of Hamilton and State of Ohio, have invented certain new and useful Improvements in Corn Harvesting and Husking Machines, of which the following is a specification, reference being had to the accompanying drawings.

My invention relates to a machine for husking corn off of the stalks standing in the field, and is mounted upon two wheels and a continuous axle, and drawn through the field by two horses. The machine straddles the row of corn to be husked, each of the driving-wheels running midway between the rows of corn, and each horse walking between the rows in front of the driving-wheel.

The object of the invention is to produce a husking-machine which will be successful in husking corn from the stalks as they stand in the field.

Figure 1:
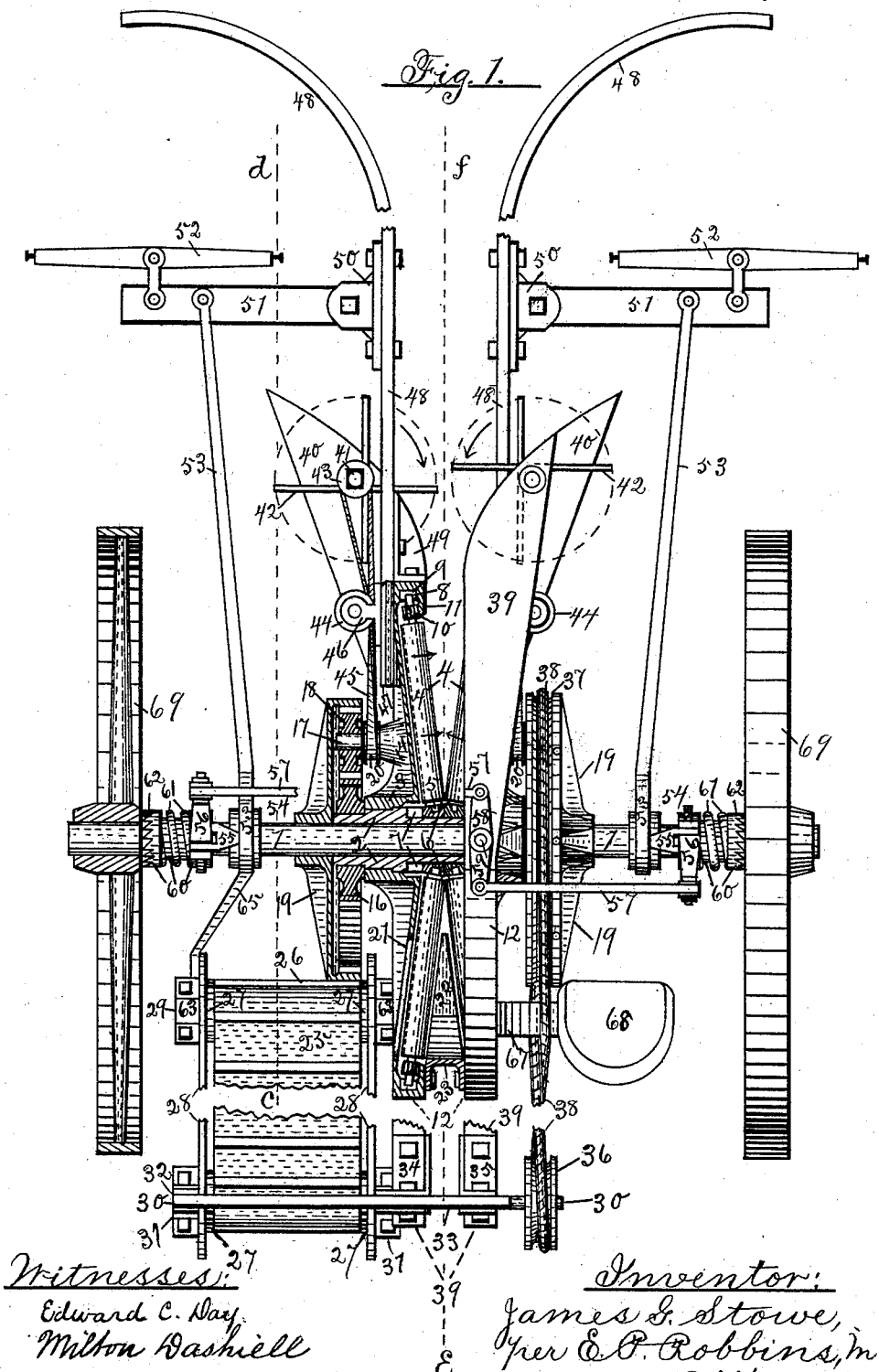
Figure 2:
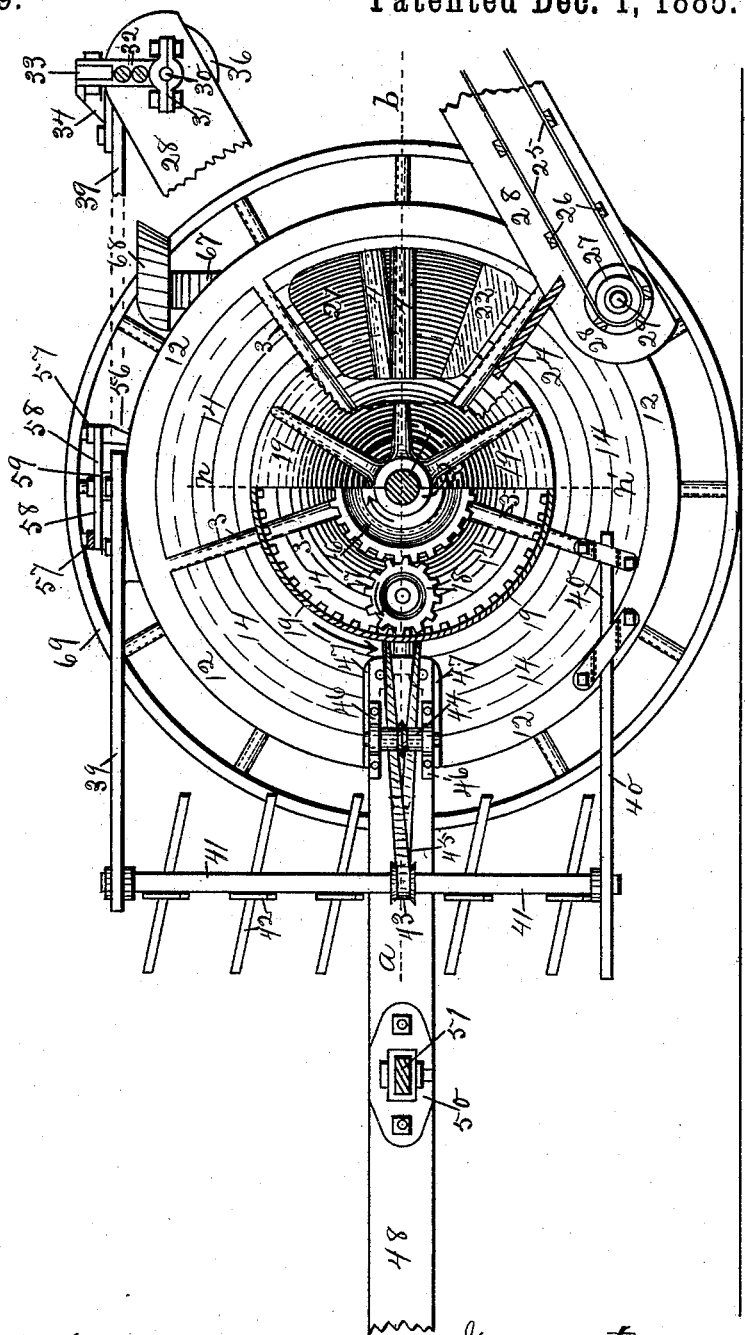

Figure 1 is a plan of the machine, the right-hand half being a top view and the left-hand half being a view in section along the horizontal plane $a\ b$ of Fig. 2. Fig. 2 is an exterior side view of the principal mechanism and framing of the machine, and a sectional view along the vertical plane $c\ d$ of Fig. 1, and looking from the left side of the machine. Fig. 3 is a view of the principal central parts of the left half of the machine and on the left of the vertical plane $e\ f$ of Fig. 1, or $g\ h$ of Fig. 4, and looking from the right side of the machine. Fig. 4 is a front view of the machine with some of the forward parts on the right hand removed to better expose the central and rear portions. Figs. 5, 6, 7, 8, 9, and 10 are detail views.

The same letters or numbers designate the same parts in all of the figures.

In this machine the ears of corn are pressed or bursted out of the husks by means of rollers, between which the stalks are directed, and the pair of rollers, acting upon a given stalk of corn forward of the machine, roll inward and downward toward the roots of the stalk, while their outer ends are carried upward toward the top of the stalk in such manner that the said rollers roll downward and inward on the stalk at about the same rate that the rollers themselves are lifted toward the top of the stalk, thereby allowing the stalk to pass between the said pair of rollers without being pulled upon.

The rollers are made of rubber or covered with rubber or similar elastic substance, and squeeze the stalks as they are moved along them, and when an ear is reached it is pushed upward and, finally, being too large to pass between the rollers, is pressed or bursted out of the husks.

Various machines have been devised in which a pair of rollers roll inward and downward and act to press or burst the ears of corn from their husks as the stalks are guided between and are pressed between the said pair of rollers; but no provision has been made in prior machines to elevate the rollers themselves as the machine is drawn forward.

The upward motion of the husking-rollers at the front of the machine, and at the same time that they rotate inward and downward and toward each other, is one of the essential features in my invention. I accomplish this upward motion of the said rollers by having them placed radially about a horizontal axis, which is at right angles to the row of corn to be husked, and by having a number of pairs of similar rollers symmetrically disposed about this axis and by giving an upward and backward rotary motion to the said pairs of rollers about the said axis.

The machine is designed so that each pair of rollers will elevate the ears husked by it and carry them over the said horizontal axis and deliver them in the rear of the machine.

In the machine shown 1 is the axle and also the driving-shaft, and the said horizontal axis is coincident with this shaft or axle.

2 is a sleeve fitted to the axle, and is symmetrical on each side of the central vertical plane, $e\ f$, of Fig. 1. Figs. 5 and 6 show the details of this sleeve 2. Fig. 6 is a view of the half on the left of the vertical plane $e\ f$ of Fig. 1, the upper portion being an exterior and the lower half a mid-section view. On the left of the line $i\ j$ in Fig. 5 is shown an exterior end view of the sleeve 2, as seen when looking in the direction of the arrow $a'$ in Fig. 6. On the right of the line $i\,j$ is shown the mid cross-section of the sleeve 2 along the plane $e\,f$, looking in the direction of the arrow $a''$. On each side of the center of the sleeve 2 there is a bearing, S', on which is mounted a circular frame-piece, 3 14 12, resembling a wheel or conical disk, having a central hub portion resting upon the bearing S', and a continuous rim portion, 12, connected to and supported by means of intermediate arms and the continuous web 14. To the front exterior side of each of these two circular frames is fastened one of the side poles, 48, by means of which the machine is drawn or guided. The circular frames 3 14 12 are stationary, and other stationary parts are attached thereto, the circular frames resting upon the bearings S' of the sleeve 2, which turns within them, and upon the axle 1, but in the reverse direction to the motion of the axle or backward.

4 are the rollers which press the ears out of their husks, and they are supported by suitable bearings in the sleeve 2 and by bearings in rings 9, which are fitted into corresponding annular inner grooves in the rims 12 of the stationary circular frames. The said rings 9 are guided by the said grooves, but are supported by spokes 13, placed between the adjacent rollers 4 and fixed in the central sleeve, 2, as shown in Figs. 3, 4, 5, and 6. Consequently the said spokes 13 and the rings 9 are rotated with and by means of the central sleeve, 2, and the husking-rollers 4, having their central bearings in the sleeve 2 and their outer bearings in the rings 9, are thus made to rotate endwise about the axle 1.

At equal distances from each other around the center of the sleeve 2 are as many longitudinal grooves 7 as there are pairs of husking-rollers, and in each groove 7 are two bearing-blocks, 6, as shown in Figs. 1, 3, 5, and 6, held against each other by means of springs 64, placed in the grooves 7, and pressing against the said blocks, as shown in Figs. 5 and 6. The spring-bearings are furnished at the central spindle, 5, because the adjacent rollers of each pair are divergent from the spindle 5, and stalks might be crowded and wedged between the inner ends of the said rollers and choke the machine, while if the spring-bearings are furnished the said adjacent rollers may yield, and hence choking be prevented.

6 is the bearing for the inner end of a roller, 4, and 8 is its bearing in the ring 9. The roller is shown in Fig. 6 as having a central core, 15, and covered with an elastic exterior, 4. The husking-rollers shown in the machine are cylindrical, but they might be partly conical, as in Fig. 8, or conical throughout their entire length, as in Fig. 7. At each end of the sleeve 2 there is a spur-wheel, 16, secured on a bearing, S. A stud, 17, projects from each circular frame 3, 14, 12, and carries a pinion, 18, which engages with the spur-wheel 16 on the sleeve 2. An internal gear-wheel, 19, fastened onto the axle 1 at each end of the sleeve 2, incloses the corresponding end of sleeve 2, the corresponding spur-wheel, 16, and the pinion 18, and, engaging with the latter, drives the said pinion, spur-wheel, and the sleeve 2, and hence the husking-rollers, upward and backward around the axle.

In Fig. 2 the internal and inclosing gear-wheel, 19, is shown in section in front of the line $n\,n'$, in order to give a side view of the gearing; and a portion of the wheel 19 is broken away in the rear of the line $n\,n'$, in order to show the full size of the opening 21, through which the husked ears are delivered to the carrier 28. As the rollers 4 are elevated, they are rotated inward and downward by means of bevel-pinions 10, attached at their outer ends, which engage with and are driven by stationary teeth attached to or forming part of the rims of the stationary side frames, 3 14 12. The rim 12 is hollow, and the said stationary teeth are radial to the axle of the machine and located on the inside of the inwardly-projecting annular ledge of the rim 12, as shown in Figs. 1 and 3, and enlarged in detail in Figs. 9 and 10.

In Fig. 3 the rim 12 and the ring 9 are shown in section in front of the vertical line $o\,o'$.

In Figs. 9 and 10 the line $p\,p'$ is a radius perpendicular to the axle, and the line $q\,q'$ is the axis of the roller 4.

Figs. 1 and 2 show how the side poles, 48, are attached to the sides of the circular frames 3 14 12. To the poles 48 are attached, at 50, extending arms 51, to which draw-rods 53 connect from the axle, and a single-tree, 52, is fastened to the end of each of the extending arms 51. The independent side poles, 48, are bowed in front of the horses for attaching the hames, and for directing the stalks between the poles, so that they will be guided into the vertical opening between the two circular frames 3 14 12. Guide-pieces 49 are attached in front of the frames 3 14 12, to prevent the stalks from catching on the frames. Near the ground horizontal projecting stalk-boards 40 are placed, which are adapted to direct straggling or inclined stalks into the opening between the frames 3 14 12, and near the top of the machine top horizontal projecting stalk-boards, 39, are placed for the same purpose. These upper and lower projecting boards, 39, and 40, serve also as supports for the vertical shafts 41, to which horizontal or inclined fingers 42 are attached, which are designed to direct the stalks inward when the vertical shafts 41 are rotated inward and toward the vertical opening between the frames 3 14 12. The vertical shafts 41 have pulleys 43, over which a wrapping-connector, as a chain or belt, passes. A similar pulley, 20, for a belt or a sprocket-wheel for a chain is attached to the inner side of each spur-pinion 18 on the stud 17, and the said flexible connectors pass over the pulleys or sprockets 20 and 43, and thus the vertical shafts 41 are driven. Guide-rollers 44 are held in bearings 46, secured to the side poles, 48, between the pulleys or sprockets 20 and 43, and separate the crossing chains or belts, and prevent them from catching in the gearing.

The stationary circular frames 3 14 12 are shown and have been described as having a continuous web, 14, between the hub portion and the rim 12, and between the spokes or radiating arms of the frames; but the continuous metal web 14 might be replaced by wood filling. Between two such arms of the left frame, and in rear of the axle, is an opening, 21, through which the ears of corn are delivered to the carrier 28. The space between the rims 12 of the circular frames adjacent this opening is closed up by the casting 23, which is bolted to the said rims, as shown in Figs. 1 and 3. To the lower end of this casting 23 is bolted a board, 22, in an inclined position, as shown in Fig. 2, and this board 22 projects between the rollers 4, as shown in Figs. 1, 2, 3, and 4, and is intended to turn the ears off of the rollers and out at the opening 21, while the back casting, 23, is intended to prevent ears from falling out behind. However, the board 22 might be attached directly to the rims 12, and not inclined sidewise, and the ears be delivered in the rear, in which case there would be no opening 21 in the side frames, 3 14 12.

The left-hand one of each pair of rollers may be, and I think should be, a little in advance of the right-hand one, as shown in Fig. 2, in order to facilitate delivering the ears into the carrier. A board or chute, 24, (shown in Figs. 2 and 4,) is attached below the opening 21, and directs the ears onto the endless carrier-belt 25.

A carrier is shown on the left side of the machine, which may be used to elevate the ears to a position, as that shown in Figs. 2 and 4. The carrier may be supported by continuing the top pieces, 39, back, as indicated in Figs. 1 and 2, and by suspending the upper end of the carrier to a cross-piece, 33, fastened to the ends of the top pieces, 39, and by fastening at the lower end to the side of the adjacent circular frame-piece 3 14 12, and to a continuation, 65, of the left draw-rod 53. The carrier shown has a cross-shaft at the upper and lower ends, provided with pulleys or sprocket-wheels for supporting and moving the endless belt 25, which is provided with suitable cross-cleats, 26, for elevating the ears. The upper cross-shaft, 30, extends across the machine and carries a pulley, 36. A groove, 37, is formed upon the periphery of the right-hand internal gear-wheel, 19, and a round belt is passed over the wheel 19 and the pulley 36, so that an upward motion is given to the upper side of the endless belt 25 when the machine is in operation. The driving-wheels 69 are provided with spring-clutches 60 61 62. 60 is a collar sliding on a spline fixed to the axle. 62 are the clutch-teeth, and 61 is the spring.

Spring-clutches are provided that the machine may be backed and turned without working the husking mechanism backward.

Provision is made for putting the husking mechanism in and out of gear by means of the shifting-levers 56 and the cross connecting-rods 57. A seat, 58, is provided on the right side of the machine for the driver, and a foot-rest, 66, is attached to the upwardly-projecting arm 55 on the right of the machine, which is provided with a fulcrum-pin for the shifting-lever 56. Another arm, 55, on the left side of the machine has a fulcrum-pin for the shifting-lever 56 on the left.

In order that but one motion may be required, and but one handle manipulated in putting the husking mechanism in or out of gear, the left-hand connecting-rod 57 is attached to one end of a horizontal piece, 58, which is pivoted at 59 to the top of the framing, and the right-hand connecting-rod is attached to the other end.

I claim—

1. In a corn harvester and husker, the combination of one pair or more of adjacent rotating rollers, their axes projecting outward from a horizontal axis at right angles to the row of corn, and mechanism, substantially as described, for revolving said rollers upward and backward about the said horizontal axis, and also about their own axes, whereby each pair of rollers will roll upon and at the same time be moved bodily upward along the stalks of corn and press or burst the ears out of their husks, substantially as set forth.

2. The combination of the drive-wheels, the main axle, the sleeve turning upon said axle, one or more pairs of adjacent rotary rollers radiating from said sleeve, bearings for the inner ends of said rollers carried by said sleeve, bearings for the outer ends of said rollers carried by a support connected to and rotating with said sleeve, and mechanism, substantially as described, for rotating said sleeve, whereby the said rollers are rotated upward and backward about said axle, substantially as and for the purpose set forth.

3. The combination of the drive-wheels, the axle, the sleeve turning upon the axle, one or more pairs of adjacent rollers radiating from the sleeve, having their bearings in said sleeve and in a support rigidly connected to said sleeve, pinions fixed on the outer ends of the rollers, stationary racks fixed upon the frame and engaging said pinions, and mechanism, substantially as described, for rotating said sleeve, whereby the rollers are rotated upward and backward about the axle, and at the same time rotated about their own axes, substantially as and for the purpose set forth.

4. The combination of the axle 1, the sleeve 2, the ring-supporting spokes 13, the rings 9, and the rollers 4.

5. The combination, with the central sleeve, 2, of the circular stationary frames 3 14 12, having bearings upon the central sleeve, and the rim of each frame having an inner groove, the rings 9, held in said grooves, the rollers 4, carried by said sleeve and rings 9 and provided with pinions, and toothed racks fixed upon said stationary frames and engaging said pinions, substantially as and for the purpose set forth.

6. The combination of the axle 1, the central sleeve, 2, the circular stationary frames 3 14 12, the spokes 13, rings 9, rollers 4, pinions 10, mechanism, substantially as described, for rotating the central sleeve, the spokes, and the rollers 4 upward and backward about the axle, and the stationary racks 11, engaging said pinions, whereby said rollers are rotated inward and downward as they are carried around the axle, the walls of the circular side frames, 3 14 12, arranged close to the sides of the rollers 4, whereby the husked ears are retained between the two opposing circular walls, and carried by the said rollers upward and backward over the axle 1 and the sleeve 2, and are delivered in the rear of the machine, substantially as and for the purpose set forth.

7. The combination of the sleeve 2, the rollers 4, and the spring-bearings for the inner ends of the rollers, substantially as and for the purpose set forth.

8. The combination of the circular frames 3 14 12, the ear-board 22, the back wall, 23, the opening 21 in the side of the circular frame, and the rollers 4, whereby the husked corn is delivered from the husking-rollers, substantially as described.

9. The combination, in a corn harvesting and husking machine, of one pair or more of adjacent rollers, means, substantially as described, for rotating them about the driving-axle, and at the same time about their own axes, frames at the sides of the rollers for confining the husked ears, an inclined carrier, and mechanism, substantially as described, for driving said carrier, whereby the husked ears may be delivered to a wagon.

10. In a corn harvester and husker, one pair or more of adjacent rotating rollers, their axes projecting outward from a horizontal axis at right angles to the row of corn, said rollers having yielding or elastic surfaces, mechanism, substantially as described, for rotating said rollers upward and backward about the said horizontal axis, and at the same time about their own axes, whereby the rollers are moved bodily upward along the stalks of corn, and at the same time roll upon said stalks to press or burst the ears out of their husks, substantially as and for the purpose set forth.

In testimony whereof I now affix my signature in presence of two witnesses.

JAMES G. STOWE.

Witnesses:
HENRY BAER, Jr.,
E. P. ROBBINS.